United States Patent Office 2,931,684
Patented Apr. 5, 1960

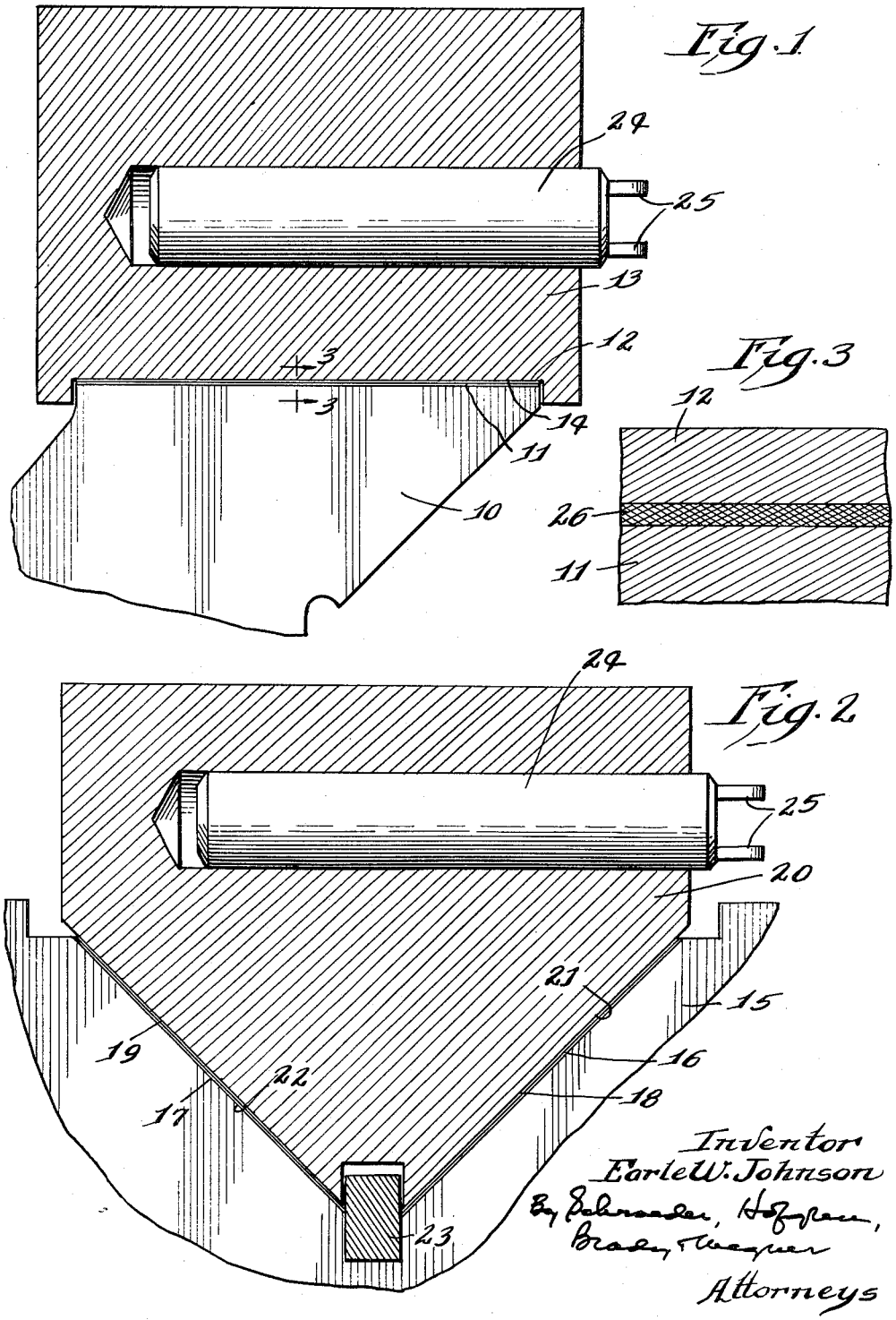

2,931,684

MACHINE TOOL WAYS

Earle W. Johnson, Rockford, Ill., assignor to Rockford Machine Tool Co., a corporation of Illinois Application June 2, 1954, Serial No. 434,040

5 Claims. (Cl. 308—3)

This invention relates to forming of bearing surfaces on machine tool ways and more particularly to the forming and replacing of surfaces of such ways on machine tools such as planers, shapers and slotters.

The surfaces of machine tool ways upon which a part such as a tool carrier may be supported for sliding movement must be flat and even to fairly precise tolerances. Without such flatness, the tool carrier cannot move in a straight line and thus the accuracy of the work performed by the machine tool can be materially affected. It is therefore important that the machine tool ways be properly formed in the first instance and it is equally important that any repair of these ways be equally carefully performed.

The ways of a machine tool may become pitted and scored after continued use requiring the replacement of the wear surfaces. In the past, metal has been added to the ways and then machined and polished to proper flatness requiring considerable down time for the machine. In later years, the use of plastic ways has also been attempted. The time that a machine is out of service for the replacement of the ways is of particular importance since the longer time a machine is down, the less production that machine has over a period of time. Ordinarily, the methods of repair in the past have required considerable polishing and work on the replaced surfaces in order to prepare them for the reception of the tool holder or other movable part. There has been particular difficulty in the repair of substantially long length ways.

Accordingly, it is the principal object of this invention to provide a new and improved method of forming and repairing machine tool ways.

A further object is to provide a way strip that may easily and quickly be applied to the way of a machine tool.

A further object is to provide a way strip for placement on the machine tool way which does not require polishing or other finishing operations before the machine can be returned to productive output.

Another object is the provision of a way strip for a machine tool way which is performed so that after its application to the way in proper manner, the machine is ready to be replaced into service.

Other objects, advantages and features of this invention will be apparent from the following description of a preferred embodiment and method taken in connection with the accompanying drawings in which:

Figure 1 is a diagrammatic sectional view through one form of a way on a planer showing the installation of the way strip of this invention upon the way;

Figure 2 is similar to Figure 1 showing the safe operations on a way of different configuration;

Figure 3 is a fragmentary sectional view taken through a portion of the way and adjacent way strip and enlarged to show the bonding layer as well as the way strip. The section is taken substantially along line 3—3 in Figure 1.

While this invention is susceptible of embodiments in many different forms, there is shown in the drawings and will herein be described in detail two specific embodiments, with the understanding that the present disclosure is to be considered as an exemplification of the principles of the invention and is not intended to limit the invention to the embodiments illustrated. The scope of the invention will be pointed out in the appended claims.

In general, the present invention utilizes a relatively thin strip of material having a preformed precise flat surface. This strip is secured to the way of the machine bed by a bonding material so that it is securely positioned on the way. In order to avoid the necessity of polishing the way strip after it is secured to the machine tool bed, the strip is pressed into position by a precision parallel or guide which extends over the length of the way. This parallel or guide is relatively heavy so that it presses the way strip into position against the bonding material. Any surface irregularities in the way surface on the machine tool bed will be accommodated by the bonding material filling the valleys and thus being thicker in some areas and thinner in others, allowing the strip to remain absolutely flat. The particular materials and steps of the method utilized will be pointed out below.

In the diagrammatic drawings accompanying the application, a substantially horizontal flat way 11 on the upper surface of a machine tool bed 10 is shown as being surfaced with a way strip 12. The way strip extends over the length of the way 11 and a parallel, pattern or guide 13 also extends over the length. The lower surface 14 of the parallel is precisely machined and polished to be absolutely flat. Thus, the parallel provides a smooth continuous surface for bearing against the way strip.

In Figure 2, the bed 15 is provided with two way surfaces 16 and 17 at 90° to each other so the machine tool way is substantially V-shaped. Each way surface is shown as being covered with a way strip 18 and 19 respectively both way strips are being pressed into position by a parallel or guide 20. Here, too, the surfaces 21 and 22 of the parallel are accurately and carefully machined and polished to be absolutely flat. A stop block 23 may be placed in the bottom cut of the machine tool way to insure that the way strips do not slide downwardly on the way surfaces before they are bonded to the bed of the machine.

In each of the guides or parallels illustrated, a cartridge type heater 24 is illustrated with electrical leads 25 which may be carried to a suitable source of energy. These heaters may be employed to heat the way strips and the bonding material to accelerate the curing of the material and its setting up to bond the strips to the bed of the machine. The specific bonding material will be mentioned hereinafter.

The way strips may be formed of very thin steel strips formed of bright tempered spring steel of from .020" to .045" thick, which has been found quite satisfactory. The steel of the strips should have a minimum hardness of 50 Rockwell, C-scale. Each strip is prepared with extra precision regarding flatness and while spring steel is mentioned specifically herein, some of the stainless steels of harder grades are also satisfactory.

The way strips may be bonded to the bed by brazing, by using an adhesive or by other bonding means. A satisfactory method has included the use of metal bonding resins such as are available in the open market. The adhesive may be applied by using a spreader to place the adhesive upon the way or upon the strip or both. Resin adhesive may also be applied by brush, roller, or spray. The resins may be cured at room temperature, however, the curing time may be accelerated by the addition of heat supplied through the parallel or guide by means of the cartridge heaters 24.

The steps performed in placing the way strips on the bed of a machine tool require very little down time for the machine. In the case of using a resin bonding material, the resin may be applied to the bed of the machine and then the preformed way strip placed in position over the adhesive. The parallel is next placed against the outer surface of the way strips with the precision machined surface or surfaces of the parallel against the outer surface of the way strip. Since the strip has been preformed with a precision flat outer surface and the parallel has a mating surface of equal character, the way strip may be forced against the adhesive and maintained substantially flat. The parallel is relatively heavy and extends along the total length of the way so that the strip is pressed uniformly throughout its length against the bed of the machine. As illustrated in Figure 3 of the drawings, the bed of the machine 11 is coated with an adhesive layer 26 which may have a thickness of about .003". The way strip 12 is illustrated with a thickness of about .020" and rests directly upon the adhesive layer 26.

Once the assembly of adhesive, way strip and parallel is made, additional pressure may be placed on top of the parallel by the equally tensioned screws, hydraulic, pneumatic or physical weight means. Additional heat may be supplied by the cartridge heaters to accelerate the curing of the resin. During the curing and setting up of the bonding material, the parallel is maintained in contact with the way strip to hold the strip absolutely flat. After sufficient curing, the parallel is removed, whereupon the ways of the machine have been surfaced in a manner which requires no additional polishing or other operation to condition the way of the machine for supporting service.

An alternate method particularly useful for repairing the ways of machine tools in the shop where they may be used is to apply the adhesive to the preformed way strip prior to its application to the machine tool. Such adhesive may be of a character requiring a catalyst or accelerator which may be applied either to the machine tool way or the adhesive just prior to its application to the machine tool. In this manner, the strips may be preformed and used to repair machines in the field. The other procedures outlined in the steps heretofore mentioned are substantially the same.

The utilization of the present invention substantially cuts down upon the down time of a machine required for repair. The expense of repairing the machine tool ways is also lowered, primarily due to the fact that the way strip need not be polished after its installation. The use of resin adhesives or other bonding materials may be readily utilized with steel ways or other metals such as bronze.

I claim:

1. In a machine tool, a smooth, precision flat way for supporting a movable machine part for movement thereover, comprising: a base metal portion having a surface conforming generally to the dimensions of the way with irregularities in said surface preventing use of said surface for directly supporting said movable machine part; a single continuous way strip of thin hardened material positioned over said base metal portion surface, said way strip having an outer preformed, smooth, precision flat surface adapted to support said movable machine part for desired movement thereover relative to the machine tool base, and bonding material between the way strip and said base metal portion surface securing the way strip to said surface and filling the irregularities in said latter surface to maintain the outer preformed surface of the way strip in said precision flat position.

2. In a machine tool, a smooth way as specified in claim 1 wherein the way strip is bright tempered spring steel having a thickness of the order of .020 inch to 0.45 inch.

3. A way strip as specified in claim 1 in which the metal strip is of bright tempered spring steel having a hardness not substantially less than 50 Rockwell, C-scale.

4. The method of replacing way surfaces on a machine tool way, comprising the steps of applying a bonding material and a preformed way strip having a precision flat outer surface upon the machine tool way, pressing the entire length of the way strip toward the tool way, maintaining the outer surface of the strip in precision flat position and in the position said outer surface should assume for supporting parts of the machine tool, for a length of time to allow the bonding material to fill surface irregularities between the way strip and tool way, applying pressure to the way strip to hold the outer surface of the strip in said precision flat position, and then curing the bonding material while maintaining said pressure upon the way strip and said strip substantially flat so that the ways may be used immediately following bonding.

5. The method of replacing way surfaces on a machine tool way, comprising the steps of positioning a way strip over the machine tool way, said strip having a pre-formed precision flat outer surface intended to form the finished way surface for the machine tool, applying a bonding material between the machine tool way and the way strip of a thickness to fill all voids and irregularities therein, moving the way strip toward final position on the machine tool way providing mutual contact of the way strip and machine tool way with the bonding material, guiding the outer surface of the way strip into its final precise location for use on the machine tool, and then maintaining the outer surface of the way strip in said final precise location while setting the bonding material so that the machine tool way is ready for immediate use following said bonding step.

References Cited in the file of this patent

UNITED STATES PATENTS

| | | |
|---|---|---|
| 2,167,609 | Dolle | July 25, 1939 |
| 2,407,145 | Elwin | Sept. 3, 1946 |
| 2,423,869 | Blessing | July 15, 1947 |
| 2,675,276 | Daugherty | Apr. 13, 1954 |
| 2,679,468 | Pitman | May 25, 1954 |
| 2,755,147 | Ernst | July 17, 1956 |